UNITED STATES PATENT OFFICE.

OLIVER W. FARRAR, OF PITTSBURG, PENNSYLVANIA.

IMPROVED MODE OF RECOVERING WASTE ACID FROM REFINING PETROLEUM.

Specification forming part of Letters Patent No. 65,361, dated June 4, 1867.

*To all whom it may concern:*

Be it known that I, OLIVER W. FARRAR, of Pittsburg, Allegheny county, Pennsylvania, have invented a new and useful Improvement in a Process of Recovering the Sulphuric Acid which has been used in Refining Petroleum, &c.; and I do hereby declare that the following is a full, clear, and exact description thereof, which will enable others skilled in the art to make and use the same.

The nature of this invention or discovery consists in an improvement in the process of restoring or recovering the sulphuric acid which has been used for refining petroleum, coal-oil, naphtha, or other similar hydrocarbon oil or substance, the said improvement being a new mode of treating and managing the spent acid, so called, or the acid after it has been employed in refining the hydrocarbon oils aforesaid, and has been drawn off from the vessels called agitators, used in oil-refineries, into tanks lined with lead, as usual.

This well-known product contains the sulphuric acid with which the oil has been refined, mixed with the tar and other impurities separated from the oil by it, and many attempts have been made to recover the acid, but with only partial success prior to the invention or discovery of the process for treating and managing it for which Letters Patent were granted Robert George Loftus, of Chelsea, Massachusetts, under date of the 14th day of June, 1864, and bearing the number 43,157.

My invention or discovery is an improvement in one part of the process described in the said Letters Patent of the said Loftus; and consists in applying weak acid obtained in the process of concentration or distillation of the sulphuric acid, for the purpose of separating and recovering the acid contained in the impure product of the oil-refineries aforesaid, instead of applying water alone, according to the process of the said Loftus. This product of the oil-refineries is placed in suitable tanks lined with lead, and weak sulphuric acid is added in sufficient quantity to dilute it completely, in order that a separation of the tarry matters and other impurities shall take place after the requisite agitation has been given to the whole body in the vessel called an agitator, and the proper time has been subsequently allowed when in a state of rest, for the deposition of the impurities, according to the method of treatment described in the Letters Patent aforesaid. The weak sulphuric acid employed by me for this purpose, instead of water alone, according to the method of the said Loftus, is a product of distillation in raising the sulphuric acid to the standard of strength required for further use in refining oils, and for manufacturing purposes generally, and the application of the weak acid thus obtained is attended with important economic results in the manufacture of this indispensable article of commerce and the arts.

The effect of weak acid in diluting and separating the tarry impurities from the acid contained in the impure product of the oil-refineries, called "spent acid," is as thorough and perfect as that of water alone, and in the subsequent evaporation and concentration of the acidulated liquor thus obtained a great saving of time and fuel is secured in restoring the acid to a proper standard of specific gravity for sulphuric acid of commerce.

I disclaim the process of diluting the spent acid of oil-refineries with water for separating the tarry matters and impurities therefrom; and I also disclaim the employment of sulphuric acid for the refining of petroleum and other hydrocarbon oils.

I further disclaim the subject-matter of the patent granted to Henry Pemberton, dated August 2, 1859, and reissued April 2, 1867; but

Having thus described my invention or discovery, what I do claim as new, and desire to secure by Letters Patent, is—

The improved process of diluting the spent acid of oil-refineries with weak sulphuric acid, as and for the purpose herein specified.

The above specification of my invention signed by me this 21st day of March, 1867.

OLIVER W. FARRAR.

Witnesses:
WM. F. MCNAMARA,
C. L. TOPLIFF.